(12) United States Patent
Balakrishnan et al.

(10) Patent No.: US 8,103,894 B2
(45) Date of Patent: Jan. 24, 2012

(54) POWER CONSERVATION IN VERTICALLY-STRIPED NUCA CACHES

(75) Inventors: Ganesh Balakrishnan, Apex, NC (US); Anil Krishna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 12/429,622

(22) Filed: Apr. 24, 2009

(65) Prior Publication Data

US 2010/0275049 A1 Oct. 28, 2010

(51) Int. Cl.
*G06F 1/00* (2006.01)
*G06F 1/26* (2006.01)
*G06F 1/32* (2006.01)
*G06F 12/00* (2006.01)
*G06F 13/00* (2006.01)

(52) U.S. Cl. ........ 713/324; 713/300; 713/320; 711/118; 711/128

(58) Field of Classification Search .......... 713/300, 713/320, 324; 711/118, 128
See application file for complete search history.

(56) References Cited

U.S. PATENT DOCUMENTS

| | | | |
|---|---|---|---|
| 5,594,886 A | 1/1997 | Smith et al. | |
| 6,105,141 A * | 8/2000 | Hanlon et al. | 713/323 |
| 6,631,445 B2 | 10/2003 | Rappoport et al. | |
| 6,662,271 B2 | 12/2003 | Smits | |
| 6,965,969 B2 * | 11/2005 | Burger et al. | 711/128 |
| 7,020,748 B2 | 3/2006 | Caprioli | |
| 7,069,390 B2 | 6/2006 | Chen et al. | |
| 7,308,537 B2 * | 12/2007 | Fields et al. | 711/128 |
| 7,523,331 B2 * | 4/2009 | Van Der Heijden | 713/323 |
| 2003/0005224 A1 | 1/2003 | Smits et al. | |
| 2003/0236817 A1 | 12/2003 | Radovic et al. | |
| 2004/0078524 A1 * | 4/2004 | Robinson | 711/133 |
| 2004/0098723 A1 | 5/2004 | Radovic et al. | |
| 2005/0044429 A1 * | 2/2005 | Gaskins et al. | 713/300 |
| 2005/0132140 A1 | 6/2005 | Burger et al. | |
| 2006/0075192 A1 * | 4/2006 | Golden et al. | 711/118 |
| 2006/0080506 A1 | 4/2006 | Rajamony et al. | |
| 2006/0112228 A1 | 5/2006 | Shen | |
| 2006/0143400 A1 | 6/2006 | Steely, Jr. | |
| 2006/0155933 A1 | 7/2006 | Buyuktosunoglu et al. | |

(Continued)

OTHER PUBLICATIONS

Changkyu Kim et al., "An Adaptive, Non-Uniform Cache Structure for Wire-Delay Dominated On-Chip Caches," Proceedings o the 10$^{th}$ International Conference on Architectural Support for Programming Languages and Operating Systems, Oct. 5-9, 2002, San Jose, CA, pp. 1-12.

(Continued)

*Primary Examiner* — Ji H Bae
(74) *Attorney, Agent, or Firm* — Wenjie Li (57) ABSTRACT

Embodiments that dynamically conserve power in non-uniform cache access (NUCA) caches are contemplated. Various embodiments comprise a computing device, having one or more processors coupled with one or more NUCA cache elements. The NUCA cache elements may comprise one or more banks of cache memory, wherein ways of the cache are vertically distributed across multiple banks. To conserve power, the computing devices generally turn off groups of banks, in a sequential manner according to different power states, based on the access latencies of the banks. The computing devices may first turn off groups having the greatest access latencies. The computing devices may conserve additional power by turning off more groups of banks according to different power states, continuing to turn off groups with larger access latencies before turning off groups with the smaller access latencies.

20 Claims, 9 Drawing Sheets

U.S. PATENT DOCUMENTS

| | | | |
|---|---|---|---|
| 2007/0014137 | A1 | 1/2007 | Mellinger et al. |
| 2008/0010415 | A1 | 1/2008 | Sawdey et al. |
| 2009/0043995 | A1 | 2/2009 | Abernathy et al. |
| 2010/0122031 | A1* | 5/2010 | Strumpen et al. ............. 711/122 |

OTHER PUBLICATIONS

Hassan Ghasemzadeh et al., "Modified Pseudo LRU Replacement Algorithm," Proceedings of the 13$^{th}$ Annual IEEE International Symposium and Workshop on Engineering of Computer Based Systems, 2006 IEEE, pp. 1-6.

Jaehyuk Huh et al., "A NUCA Substrate for Flexible CMP Cache Sharing," 19$^{th}$ International Conference on Supercomputing, ISC'05, Jun. 20-25, 2005, Boston, MA, pp. 1-10.

Changkyu Kim et al., "An Adaptive Cache Structure for Future High-Performance Systems," http://domino.watson.ibm.com/acas/w3www_acas.nsf/images/projects_01.02/$FILE/01burger.pdf,, pp. 1-12, 2002.

Bardine et al., "Way Adaptable D-Nuca Cache," pdf created from html version of cached Google page (http://www.sarc-ip.org/files/foglia/Workshop/Poster%20abstrat%20Acaces%202006.pdf), 2006, pp. 1-4.

Naveen Muralimanohar et al., "Interconnect Design Considerations for Large NUCA Caches," http://www.cs.utah.edu/~rajeev/pubs/isca07.pdf, ISCA'07, Jun. 9-13, 2007, San Diego, California, USA, pp. 1-12.

Jaehyuk Huh et al., "Exploring the Design Space of Future CMPs," Proceedings of the 2001 International Conference on Parallel Architectures and Compilation Techniques, Sep. 8-12, 2001, p. 199-210.

U.S. Appl. No. 12/429,586, filed Apr. 24, 2009, Ganesh Balakrishnan et al.

U.S. Appl. No. 12/429,754, filed Apr. 24, 2009, Ganesh Balakrishnan et al.

* cited by examiner

BANK POWER STATE LEGEND:  ☐ =ON   ■ =OFF

POWER CONSERVATION IN VERTICALLY-STRIPED NUCA CACHES

TECHNICAL FIELD

The present invention generally relates to the management of caches of a computing device. More specifically, the invention relates to conserving power in non-uniform cache access (NUCA) systems.

BACKGROUND

Cache memories have been used to improve processor performance, while maintaining reasonable system costs. A cache memory is a very fast buffer comprising an array of local storage cells used by one or more processors to hold frequently requested copies of data. A typical cache memory system comprises a hierarchy of memory structures, which usually includes a local (L1), on-chip cache that represents the first level in the hierarchy. A secondary (L2) cache is often associated with the processor for providing an intermediate level of cache memory between the processor and main memory. Main memory, also commonly referred to as system or bulk memory, lies at the bottom (i.e., slowest, largest) level of the memory hierarchy.

In a conventional computer system, a processor is coupled to a system bus that provides access to main memory. An additional backside bus may be utilized to couple the processor to a L2 cache memory. Other system architectures may couple the L2 cache memory to the system bus via its own dedicated bus. Most often, L2 cache memory comprises a static random access memory (SRAM) that includes a data array, a cache directory, and cache management logic. The cache directory usually includes a tag array, tag status bits, and least recently used (LRU) bits. (Each directory entry is called a "tag".) The tag RAM contains the main memory addresses of code and data stored in the data cache RAM plus additional status bits used by the cache management logic.

Recent advances in semiconductor processing technology have made possible the fabrication of large L2 cache memories on the same die as the processor core. As device and circuit features continue to shrink as the technology improves, researchers have begun proposing designs that integrate a very large (e.g., multiple megabytes) third level (L3) cache memory on the same die as the processor core for improved data processing performance. While such a high level of integration is desirable from the standpoint of achieving high-speed performance, there are still difficulties that must be overcome.

Large on-die cache memories are typically subdivided into multiple cache memory banks, which are then coupled to a wide (e.g., 32 bytes, 256 bits wide) data bus. In a very large cache memory comprising multiple banks, one problem that arises is the large resistive-capacitive (RC) signal delay associated with the long bus lines when driven at a high clock rate (e.g., 1 GHz). Further, various banks of the cache may be wired differently and employ different access technologies.

One type of cache is referred to as Uniform Cache Access (UCA), or Uniform Cache Architecture. UCA caches are multi-bank caches that enforce equal latency to all banks. UCA ensures that all banks are wired with traces of equal length, or have appropriate delay elements inserted along the traces. Although UCA ensures equal latency to all banks, it forces all banks to operate with the highest latency because the latency is determined by the latency to the furthest bank.

Another type of cache is referred to as Non-Uniform Cache Access (NUCA), or alternatively referred to as Non-Uniform Cache Architecture. In NUCA caches, the latency to a bank generally depends on the proximity to the device making the request, which frequently is a processor. NUCA allows banks closest to the processor to respond the fastest and forces the banks furthest from the processor to respond the slowest. NUCA caches are traditionally large in size and consume relatively large amounts of power. Current power savings techniques do not cater to NUCA architectures.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Some embodiments comprise a method that includes enabling a number of banks of a NUCA cache, with the ways of the cache being vertically distributed across multiple banks. The embodiments generally comprise sequentially disabling individual banks of the plurality to conserve power. The sequence of disabling may first comprise turning off individual banks with the greatest access latencies and turning off individual banks with the least access latencies after turning off banks with greater latencies. When disabling of the individual banks, the embodiments may generally turn off sets of banks grouped via discrete power states.

Further embodiments comprise apparatuses having banks of a non-uniform cache access (NUCA) cache, with the ways being vertically distributed across multiple banks. The embodiments comprise switches configured to turn off groups of banks. Banks may generally be assigned to different groups based on access latencies. State selectors may be coupled to the switches to select different power states of the NUCA caches. The state selectors are arranged to turn off groups of banks with the greatest access latencies before turning off other groups with smaller latencies.

Other embodiments comprise systems for conserving power in NUCA caches. The systems comprise processors coupled to banks of NUCA caches. The processors may generally search the ways of the NUCA cache, with the ways being vertically distributed across multiple banks of the NUCA cache. The systems also have a number of switches configured to turn off groups of banks, wherein each of the groups comprises banks aggregated based on relative distances of banks to the plurality of processors. The systems are configured to sequentially turn off groups with the larger relative distances before turning off groups with the smaller relative distances.

Even further embodiments comprise a computer program product of a computer readable storage medium including instructions that search ways of a plurality of banks of NUCA caches, wherein the ways are vertically distributed across multiple banks of the NUCA cache. The instructions, when executed by at least one processor, may also sequentially turn off groups of banks, with each of the groups comprising banks aggregated based on access latencies. Even further, the instructions may generally turn off groups with larger access latencies before turning off groups with smaller access latencies.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

In various embodiments, a cache may have many blocks which individually store the various instructions and data values. The blocks in a cache may be divided into groups of blocks called sets or congruence classes. A set may refer to the collection of cache blocks in which a given memory block may reside. For a given memory block, there may be a unique set in the cache that the block can be mapped into, according to preset (variable) mapping functions. The number of blocks in a set generally refers to as the associativity of the cache, e.g. 2-way set associative means that for a given memory block there are two blocks in the cache that the memory block can be mapped into. However, several different blocks in main memory may be mapped to a given set. A 1-way set associative cache is direct mapped, that is, there is only one cache block that may contain a particular memory block. A cache may be said to be fully associative if a memory block can occupy any cache block, i.e., there is one congruence class, and the address tag is the full address of the memory block.

An exemplary cache line (block) may include an address tag field, a state bit field, an inclusivity bit field, and a value field for storing the actual instruction or data. The state bit field and inclusivity bit fields are generally used to maintain cache coherency in a multiprocessor computer system (to indicate the validity of the value stored in the cache). The address tag is usually a subset of the full address of the corresponding memory block. A compare match of an incoming address with one of the tags within the address tag field may indicate a cache "hit". The collection of all of the address tags in a cache (and sometimes the state bit and inclusivity bit fields) is frequently referred to as a directory, and the collection of all of the value fields is often called the cache entry array.

Generally speaking, methods, apparatuses, and computer program products to dynamically conserve power in non-uniform cache access (NUCA) caches are contemplated. Various embodiments comprise a computing device, having one or more processors coupled with one or more NUCA cache elements. The NUCA cache elements may comprise numerous banks of cache memory, wherein the ways to the cache are vertically distributed across multiple banks.

To conserve power, the computing devices generally start turning off groups of banks. The groups may generally comprise banks with equal or relatively similar access times. For example, several banks having relatively long access times may be grouped together, while several other banks having relatively short access times may be grouped separately. The computing devices may generally turn off groups, in a sequential manner according to different power states, based on the access latencies. The computing devices may first turn off groups having the greatest access latencies. The computing devices may conserve additional power by turning of more groups of banks according to different power states, continuing to turn off groups with higher access latencies before turning off groups with the lowest access latencies.

Figure 1:
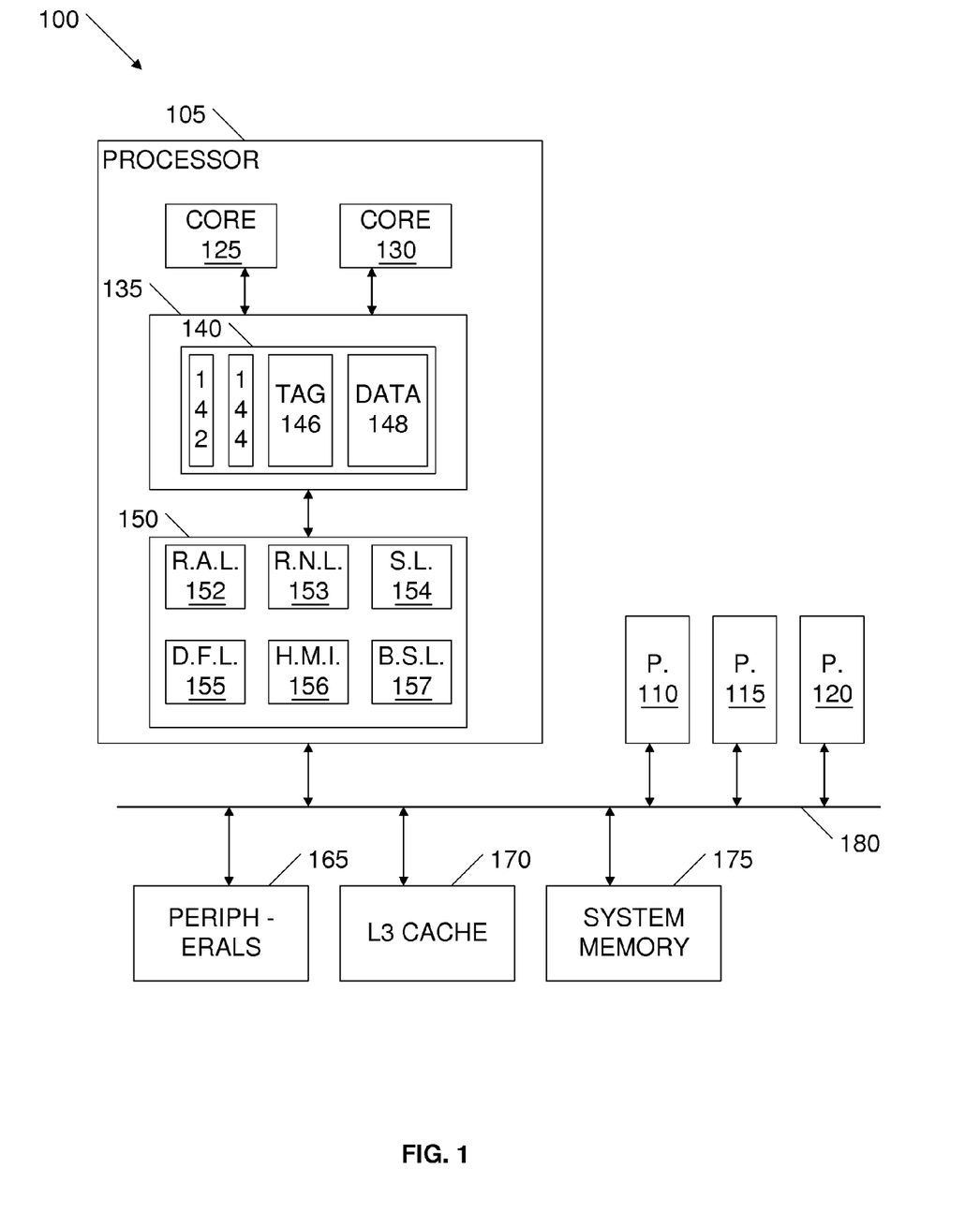
FIG. 1 depicts an embodiment of a system that may conserve power in a NUCA cache.

Turning now to the drawings, FIG. 1 depicts a system 100 arranged to conserve power in a vertically distributed NUCA cache 135. In numerous embodiments system 100 may comprise a desktop computer. In other embodiments system 100 may comprise a different type of computing device, such as a server, a mainframe computer, part of a server or a mainframe computer system, such as a single board in a multiple-board server system, or a notebook computer. System 100 may operate with different operating systems in different embodiments. For example, system 100 may operate using AIX®, Linux®, Macintosh® OS X, Windows®, or some other operating system. Further, system 100 may even operate using two or more operating systems in some embodiments, such as embodiments where system 100 executes a plurality of virtual machines.

System 100 has four processors, 105, 110, 115, and 120. Different embodiments may comprise different numbers of processors, such as one processor, two processors, or more than four processors. Each processor may comprise one or more cores. For example, processor 105 comprises two cores, 125 and 130, in the embodiment depicted in FIG. 1.

While not specifically depicted in FIG. 1, cores 125 and 130 may also each comprise L1 cache. System 100 may also have one or more L2 cache elements, such as NUCA cache 135. NUCA cache 135 may comprise a number of banks, such as bank 140. Only one bank is shown for the sake of simplicity, as NUCA cache 135 may comprise a plurality of banks in addition to bank 140 even though not specifically depicted in FIG. 1. In various embodiments of system 100, one or more of the L1 cache and L2 cache structures, as well as L3 cache 170, may comprise NUCA caches. System 100 may conserve power by systematically switching off different banks of the NUCA caches.

NUCA cache 135 may store data and associated tags in a non-uniform access manner. The banks of NUCA cache 135 may be arranged according to a distance hierarchy with respect to core 125 and core 130. The distance hierarchy may refer to the several levels of delay or access time. The access delays may include the accumulated delays caused by interconnections, connecting wires, stray capacitance, gate delays, etc. An access delay may or may not be related to the actual distance from a bank to an access point. The access point may be a reference point from which access times are computed, such as a point of a core or a point distanced half way between two cores. The accumulated delay or access time from the reference point to the bank, or at least a point in the bank, may be referred to as the latency.

The distance hierarchy may include a lowest latency bank and a highest latency bank. The lowest latency bank may comprise the bank that has the lowest latency or shortest access time with respect to a common access point. The highest latency bank may comprise the bank that has the highest latency or longest access time with respect to a common access point. Each NUCA memory bank, such as bank 140, may include many memory devices.

The memory banks of NUCA cache 135 may be organized into a number of N-ways, where N is a positive integer, in an N-way set associative structure. The different memory banks in NUCA cache 135 may be laid out or organized into a linear array, a two-dimensional array, or a tile structure. Each of the memory banks may include a data storage device 148, a tag storage device 146, a valid storage device 144, and a replacement storage device 142. Data storage device 148 may store the cache lines. Tag storage device 146 may store the tags associated with the cache lines. Valid storage device 144 may store the valid bits associated with the cache lines. Replacement storage device 142 may store the replacement bits associated with the cache lines. When a valid bit is asserted (e.g., set to logic TRUE), the assertion may indicate that the corresponding cache line is valid. Otherwise, the corresponding cache line may be invalid. When a replacement bit is asserted (e.g., set to logic TRUE), the assertion may indicate that the corresponding cache line has been accessed recently. Otherwise, the assertion may indicate that the corresponding cache line has not been accessed recently. In alternative embodiments, any of the storage devices 148, 146, 144, and 142 may be combined into a single unit. For example, the tag and replacement bits may be located together and accessed in serial before the data is accessed.

The processors of system 100 may be connected to other components via a system or fabric bus 180. Fabric bus 180 may couple processors 105, 110, 115, and 120 to system memory 175. System memory 175 may store system code and data. System memory 175 may comprise dynamic random access memory (DRAM) in many embodiments, or static random access memory (SRAM) in some embodiments, such as with certain embedded systems. In even further embodiments, system memory 175 may comprise another type of memory, such as flash memory or other nonvolatile memory.

The processor 105 of system 100, as well as any of processors 110, 115, and 120, represents one processor of many types of architectures, such as an embedded processor, a mobile processor, a micro-controller, a digital signal processor, a superscalar processor, a vector processor, a single instruction multiple data (SIMD) processor, a complex instruction set computer (CISC) processor, a reduced instruction set computer (RISC) processor, a very long instruction word (VLIW) processor, or a hybrid architecture processor. One or more of processors 105, 110, 115, and 120 may comprise one or more L1 and L2 caches. For example, processor 105 comprises an L2 cache, NUCA cache 135.

The manner in which a system may conserve power via NUCA caches may vary. In many embodiments, a processor may execute instructions of a program or an operating system when turning off one or more portions of NUCA caches to conserve power. For example, core 130 may execute instructions of a program that turn off four portions of NUCA cache 135. Alternatively, in other embodiments, a processor may have hardware circuitry that conserves power by selectively shutting down portions of NUCA caches. For example, cache controller 150 may comprise counters and timers that work together to monitor the activity of data stored in NUCA cache 135. During periods of little or no processor 105 activity, cache controller 150 may recognize the inactivity and seize the opportunity to conserve power by turning off portions of NUCA cache 135.

System 100 may also include firmware which stores the basic input/output logic for system 100. The firmware may cause system 100 to load an operating system from one of the peripherals whenever system 100 is first turned on, or booted. In one or more alternative embodiments, the firmware may conserve power by turning off portions of NUCA caches. For example, the firmware may copy dirty data from least recently used (LRU) portions of L3 cache 170 to system memory 175 and turn off one or more portions of L3 cache 170 to conserve power.

Processor 105 has a cache controller 150, which may support the access and control of a plurality of cache ways in NUCA cache 135. The individual ways may be selected by a way-selection module residing in cache controller 150. Additional cache levels may be provided, such as an L3 cache 170 which is accessible via fabric bus 180. Cache controller 150 may control NUCA cache 135 by using various cache operations. These cache operations may include placement, eviction or replacement, filling, coherence management, etc. In particular, cache controller 150 may perform a non-uniform pseudo least recently used (LRU) replacement on NUCA cache 135. The non-uniform pseudo LRU replacement may comprise a technique to replace or evict cache data in a way when there is a cache miss and tends to move more frequently accessed data/instructions to positions closer to a processor or core. For example, system 100 may use an algorithm that detects repeated accesses by the different processors and then replicates data of a bank in a bank physically closer to the processors. In this manner, each processor can access the block with reduced latency and help prepare banks located farthest from the processors for switching operations associated with power conservation.

Cache controller 150 may also comprise a hit/miss/invalidate detector 156, replacement assert logic 152, a replacement negate logic 153, search logic 154, and data fill logic 155 which work in conjunction with bank switch logic 157. During operation of system 100, bank switch logic 157 may select certain banks to turn off, work with the other modules of cache controller 150 to prevent fresh data/instructions from being copied into those banks, and then turn off the banks as soon as operationally feasible. Any combination of these modules may be integrated or included in a single unit or logic of cache controller 150. Note that cache controller 150 may contain more or fewer than the above modules or components. For example, in an alternative embodiment, cache controller 150 may also comprise a cache coherence manager for uni-processor or multi-processor systems.

In various embodiments, the caches of system 100 may be coherent and utilize a coherency protocol. For example, one embodiment may utilize a MESI (modified-exclusive-shared-invalid) protocol, or some variant thereof. Each cache level, from highest (L1) to lowest (L3), may successively store more information, but at a longer access penalty. For example, the on-board L1 caches in processor cores 125 and 130 might have a storage capacity of 128 kilobytes of memory, NUCA cache 135 might have a storage capacity of 1024 kilobytes common to both cores, and L3 cache 170 might have a storage capacity of 8 megabytes (MB). Different embodiments may turn off different amounts of NUCA L1, L2, and L3 caches to conserve power. For example, in one embodiment where L3 cache 170 comprises 8 MB of NUCA cache, the embodiment may be able to turn off only 6 MB out of the 8 MB to conserve power. In other words, the embodiment may not be configured to turn off all portions of L3 cache 170. In another embodiment with an alternative configuration, however, all 8 MB may be turned off.

L1 cache, NUCA cache 140, and/or L3 cache 170 may include data or instructions or both data and instructions. One or more of the caches may comprise fast static random access memory (RAM) devices that store frequently accessed data or instructions in a manner well known to persons skilled in the art. The caches may contain memory banks that are connected with wires, traces, or interconnections. As noted previously, the wires or interconnections introduce various delays. The delays may be generally non-uniform and depend on the location of the memory banks in the die or on the board. As will be illustrated below, system 100 may take into account the various delays when determining which portions of the NUCA caches to turn off when conserving power.

The cache structure of L3 cache 170 for system 100 is located externally to processors 105, 110, 115, and 120. In alternative embodiments, L3 cache 170 may also be located inside a chipset, such as a memory controller hub (MCH), an input/output (I/O) controller hub (ICH), or an integrated memory and I/O controller. The processors of system 100 may be connected to various peripherals 165, which may include different types of input/output (I/O) devices like a display monitor, a keyboard, and a non-volatile storage device, as examples.

In some embodiments, peripherals 165 may be connected to fabric bus 180 via, e.g., a peripheral component interconnect (PCI) local bus using a PCI host bridge. A PCI bridge may provide a low latency path through which processors 105, 110, 115, and 120 may access PCI devices mapped within bus memory or I/O address spaces. A PCI host bridge may also provide a high bandwidth path to allow the PCI devices to system memory 175. Such PCI devices may include, e.g., a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices.

Figure 2A:
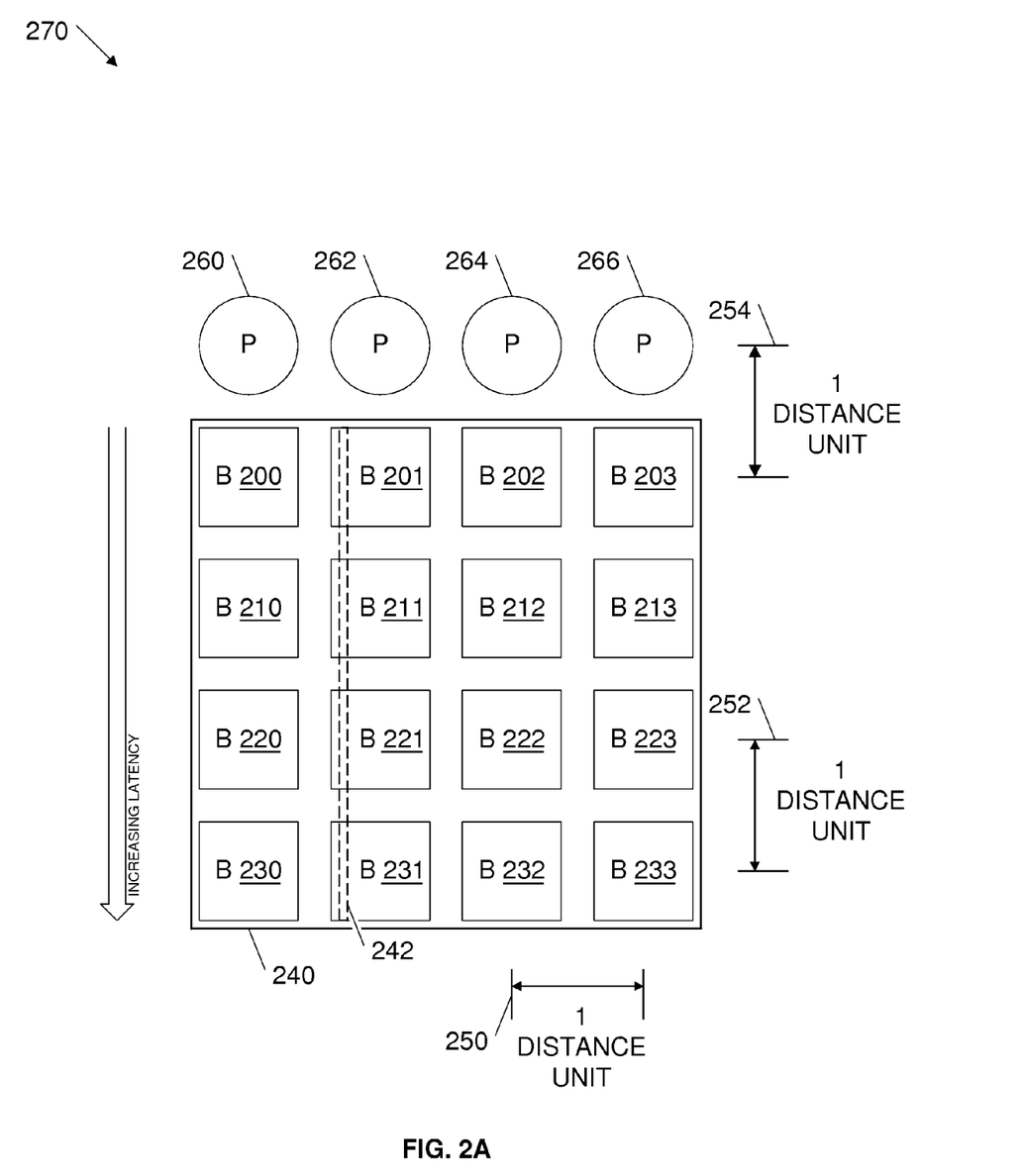
FIGS. 2A-2C illustrate how access latencies of a NUCA cache may vary based on distances between banks of the NUCA cache and processors.
Figure 2B:
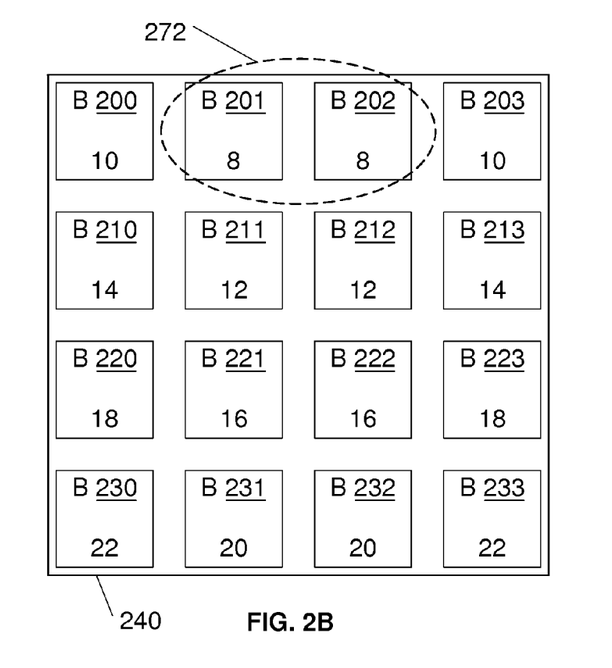
Figure 2C:
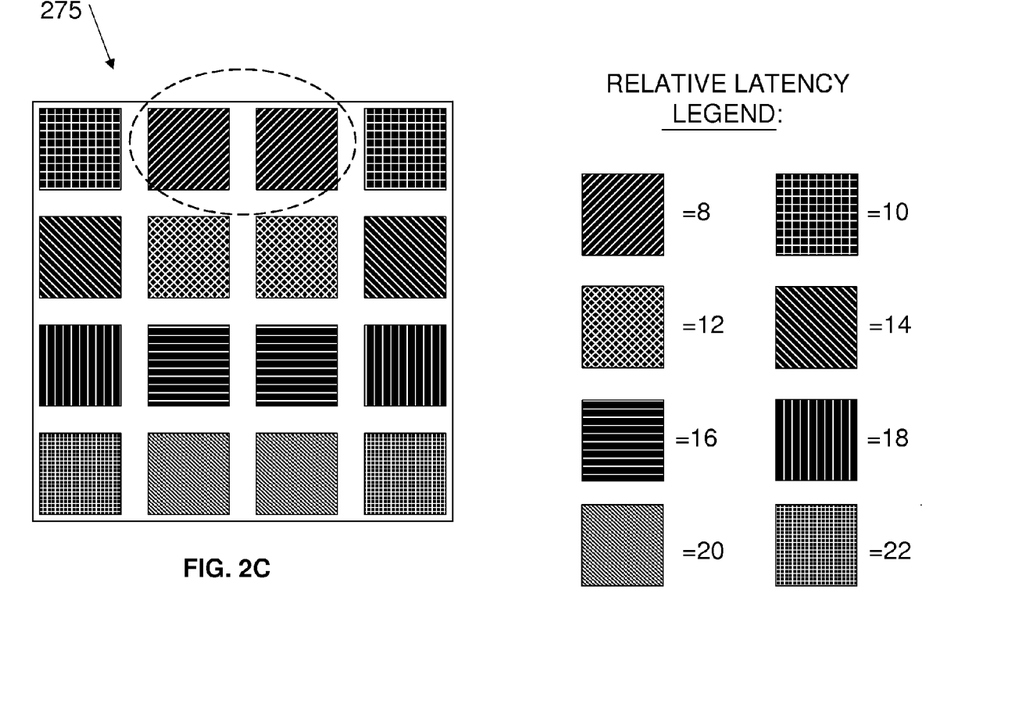

FIGS. 2A-2C illustrate how access latencies of a NUCA cache may vary based on distances between banks of the NUCA cache and processors. In FIG. 2A, a system 270 may comprise four processors, 260, 262, 264, and 266. As noted previously, alternative embodiments may comprise more or fewer processors. For example, while system 270 depicts four processors, alternative systems and apparatuses may comprise uni-processor systems and apparatuses. Additionally, depending on the embodiment and/or technology, one or more of the processors may be replaced by cores. While not shown in FIG. 2A, each of processors 260, 262, 264, and 266 may comprise small single-banked caches, e.g. L1 caches.

Processors 260, 262, 264, and 266 may also be coupled with large multi-banked lower level cache 240. Cache 240 may comprise a NUCA cache.

Cache 240 may comprise an n-way set associative cache, wherein cache blocks are grouped into sets, with each set comprising a number, n, of cache blocks or ways that are searched in parallel for cache hits. Apart from being logically organized into ways and sets, cache 240 is physically organized into a number of different banks. More specifically, cache 240 comprises 16 banks, bank 200 through bank 203, bank 210 through bank 213, bank 220 through bank 223, and bank 230 through bank 233.

As FIG. 2A illustrates, the ways of cache set 242 are vertically distributed across four banks, more specifically banks 201, 211, 221, and 231. Having cache sets vertically distributed across multiple banks may allow cache lines in a given cache set to reside in one of many banks, some closer to the processors and some farther away. Therefore, depending on which bank a certain cache set maps to, access to the set could be much slower compared to a different set in cache 240. For example, bank 201 is relatively close to processors 260, 262, 264, and 266, while bank 231 is relatively far from processors 260, 262, 264, and 266. In other words, bank 231 will have larger access latency than bank 201.

Cache 240 may be large in size and consume a considerable amount of power in a computing device. System 270 may provide static power savings in vertically-striped multibank cache 240 by taking processor-bank distance/latency into account. For each bank in cache 240 a relative distance may be computed. In computing the relative distances for the banks of cache 240, one may tally the horizontal and vertical distances from bank-to-bank, elements 250 and 252, respectively, as well as the bank-to-processor distance(s), element 254. The relative distance for a bank may be defined as the sum of the distances from the bank to each of the processors. For example, the relative distance for bank 200 may equal 10 distance units.

In calculating the relative distance for bank 200, one may calculate the number of banks that are needed to be traversed in order to reach bank 200 from each of the processors. More specifically, the relative distance for bank 200 may equal the sum of the distance between bank 200 and processor 260, the distance between bank 200 and processor 262, the distance between bank 200 and processor 264, and the distance between bank 200 and process 266. The distance between bank 200 and processor 260 is equal to one distance unit (element 254). The distance between bank 200 and processor 262 is equal to one horizontal distance unit (element 250) plus the one vertical distance unit between bank 201 and processor 262. The distance between bank 200 and processor 264 is equal to two horizontal distance units (element 250) plus the one vertical distance unit between bank 202 and processor 264. Similarly, the distance between bank 200 and processor 266 equals three horizontal distance units plus the one vertical distance unit between bank 203 and processor 266. In summing the individual distances between bank 200 and each the processors, the relative distance for bank 200 may equal 1+2+3+4, which equals the 10 distance units noted previously.

This same methodology may be applied to each of the other individual banks of cache 240 to calculate relative distances for each of the banks. The computed relative distances for cache 240 are shown in Table 1. In FIGS. 2B and 2C, the individual relative distances are shown, numerically and graphically, for each of the individual banks. As FIGS. 2A and 2B illustrate, banks 201 and 202 both have relative distances of eight. Consequently, banks 201 and 202 may both be aggregated into one group 272. Banks 200 and 203 both have relative distances of 10, and may be aggregated into another group. The other banks may be aggregated into other groups based on the calculated relative distances, which again may correspond to the access latencies.

TABLE 1

| BANK | DISTANCE SUMMATION | RELATIVE DISTANCE |
|---|---|---|
| 200 | 1 + 2 + 3 + 4 | 10 |
| 201 | 2 + 1 + 2 + 3 | 8 |
| 202 | 3 + 2 + 1 + 2 | 8 |
| 203 | 4 + 3 + 2 + 1 | 10 |
| 210 | 2 + 3 + 4 + 5 | 14 |
| 211 | 3 + 2 + 3 + 4 | 12 |
| 212 | 4 + 3 + 2 + 3 | 12 |
| 213 | 5 + 4 + 3 + 2 | 14 |
| 220 | 3 + 4 + 5 + 6 | 18 |
| 221 | 4 + 3 + 4 + 5 | 16 |
| 222 | 5 + 4 + 3 + 4 | 16 |
| 223 | 6 + 5 + 4 + 3 | 18 |
| 230 | 4 + 5 + 6 + 7 | 22 |
| 231 | 5 + 4 + 5 + 6 | 20 |
| 232 | 6 + 5 + 4 + 5 | 20 |
| 233 | 7 + 6 + 5 + 4 | 22 |

Figure 3A:
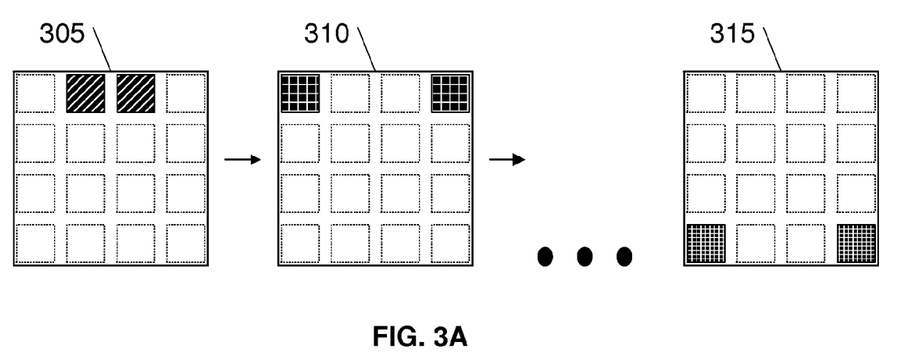
FIGS. 3A-3C illustrate how banks of a NUCA cache may be assigned to different groups, and how the groups may be sequentially switched on and off according to different power states.
Figure 3B:
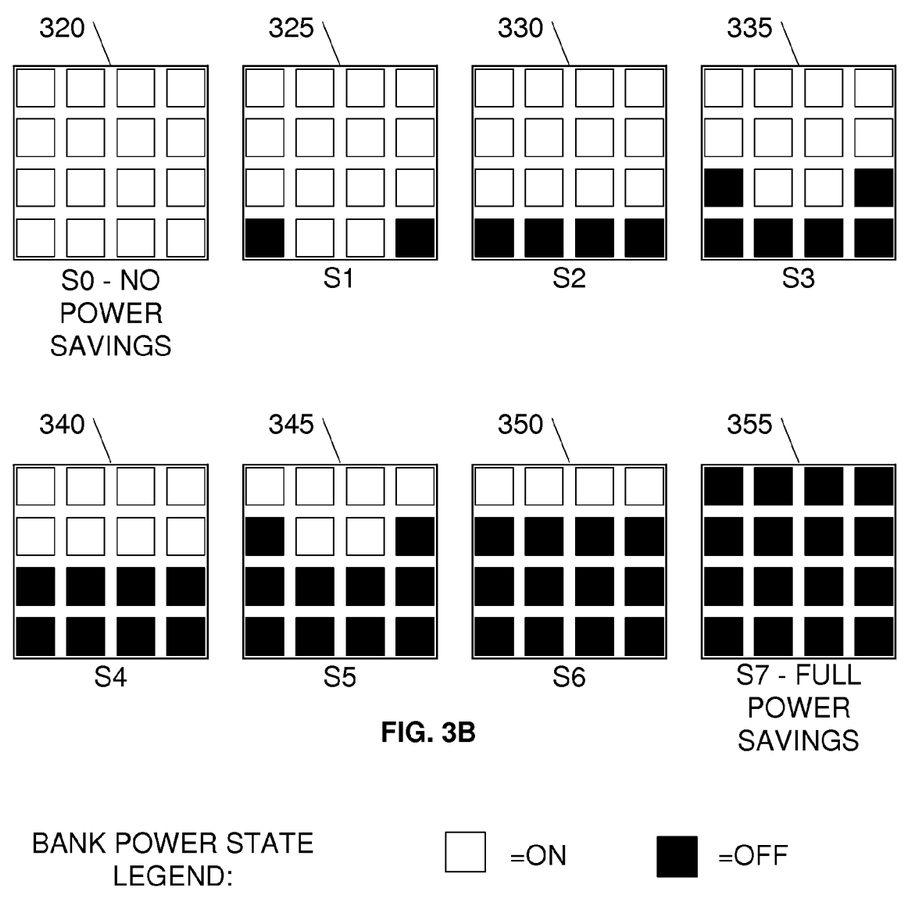
Figure 3C:
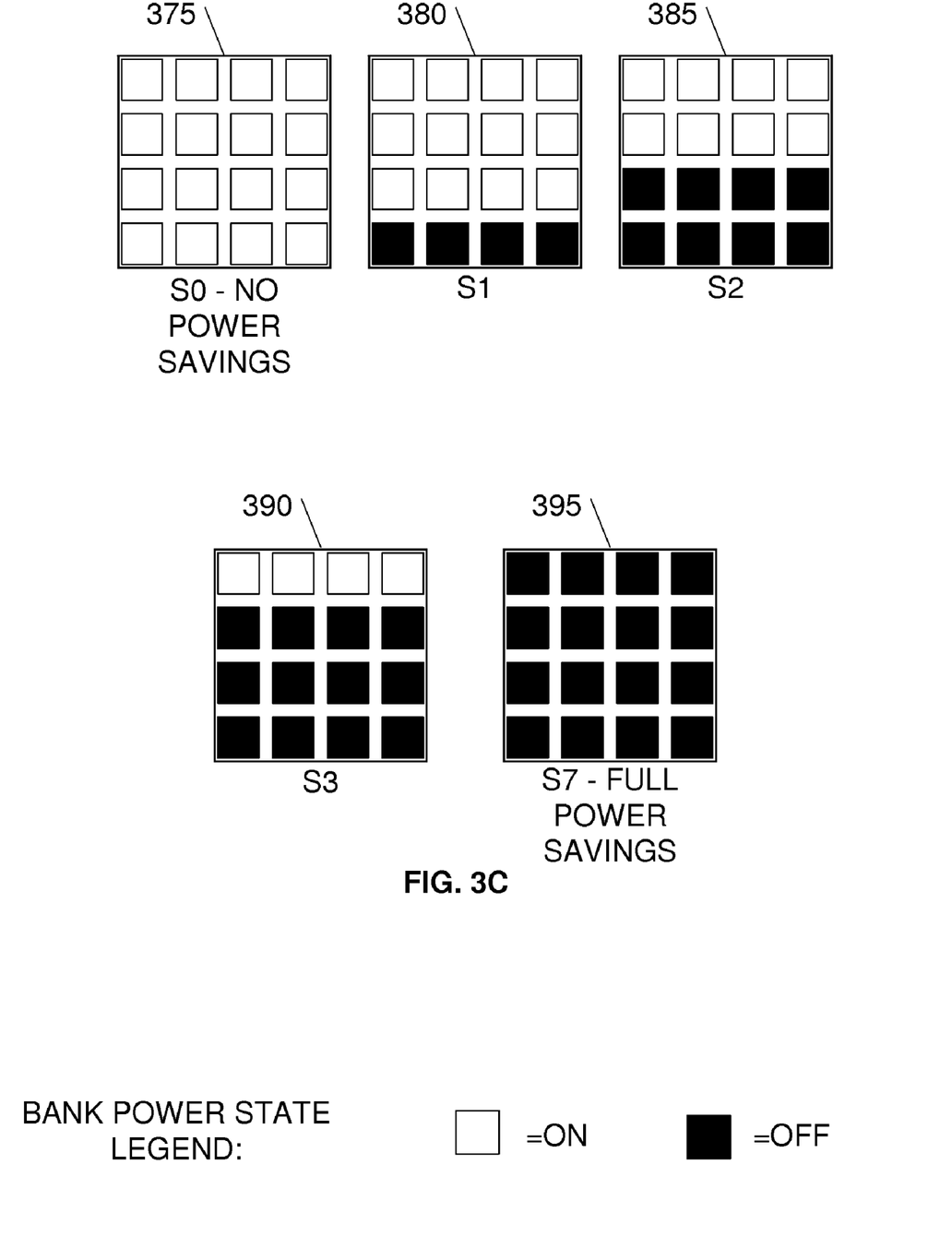

FIGS. 3A-3C illustrate how banks of a NUCA cache may be assigned to different groups, and how the groups may be sequentially switched on and off according to different power states. Element 305, in FIG. 3A, illustrates how two banks with the lowest relative latencies may comprise one group and be switched on and off together. Element 310 shows how the two banks with the next-lowest relative latencies may comprise a second group and be switched on and off together. For example, the banks emphasized in element 305 may correspond to banks 201 and 202 of FIG. 2B, while the banks emphasized in element 310 may correspond to banks 200 and 203. Element 315 shows how the two banks with the greatest relative latencies, which may correspond to banks 230 and 233, comprise yet another group and may be switched on and off together.

An embodiment may define different power states for the NUCA cache, such as power states S0, S1 ... Sn. Depending on the power state, various portions of cache may be turned off. In many embodiments the portions of cache which are turned off may comprise groups of banks. However, alternative embodiments may turn off smaller portions of cache than groups of banks. For example, an embodiment may sequentially turn off individual banks, in which case each group would comprise only one bank. Even further, other alternative embodiments may turn off sections or parts of a bank, instead of entire banks. In turning off the various portions of cache for the different power states, the embodiments may first choose banks with the higher weighted distances. Additionally, numerous embodiments may also ensure that at least one of the banks in each of the vertical arrays is always active.

FIG. 3B illustrates how different groups of banks in a NUCA cache may be switched on and off and form eight different power states. NUCA cache state 320 may comprise one state where all banks and/or groups of the NUCA cache are switched on. In other words, state 320 may allow for no power savings in a NUCA cache. State 325 shows that an embodiment may first turn off a group of two banks with the greatest access latencies. For example, state 325 may comprise turning off banks 230 and 233 while leaving the rest of the banks operating. If the embodiment needs to conserve additional power, the embodiment may turn off another group comprising banks with the next-greatest access latencies. Continuing with our example, state 330 may comprise turning off banks 231 and 232 in addition to banks 230 and 233. The embodiment may continue to conserve additional amounts of power by selecting states 335, 340, 345, and 350, which may involve sequentially turning off or disabling groups of banks with incrementally smaller and smaller access latencies. State 355 may comprise lastly turning off the banks with the smallest access latencies, which may permit the greatest amount of power savings.

FIG. 3C illustrates an alternative embodiment having a smaller number of power states and an alternative grouping of banks. NUCA cache state 375 may comprise one state where all banks and/or groups of the NUCA cache are operating. State 380 shows that the alternative embodiment may first turn off a group of four banks with the greatest access latencies. For example, selecting state 380 may comprise turning off banks 230, 231, 232, and 233 while leaving the rest of the banks operating. If the embodiment needs to conserve additional power, the embodiment may turn off another group comprising banks with the next-greatest access latencies. Selecting state 385 may involve turning off banks 220, 221, 222, and 223 in addition to the banks which are already off. Selecting state 390 may involve turning off banks 210, 211, 212, and 213 in addition to the banks which are already off. Selecting state 385 while and embodiment is in state 390 may involve turning on banks 210, 211, 212, and 213. Selecting state 355 may afford the greatest amount of power savings by turning off the remaining group of banks the smallest access latencies. By comparing the two different power schemes illustrated in FIGS. 3B and 3C, one may see that FIG. 3C illustrates a more aggressive power saving scheme, which involves turning off groups with larger numbers of banks than the groups of FIG. 3B.

Figure 4A:
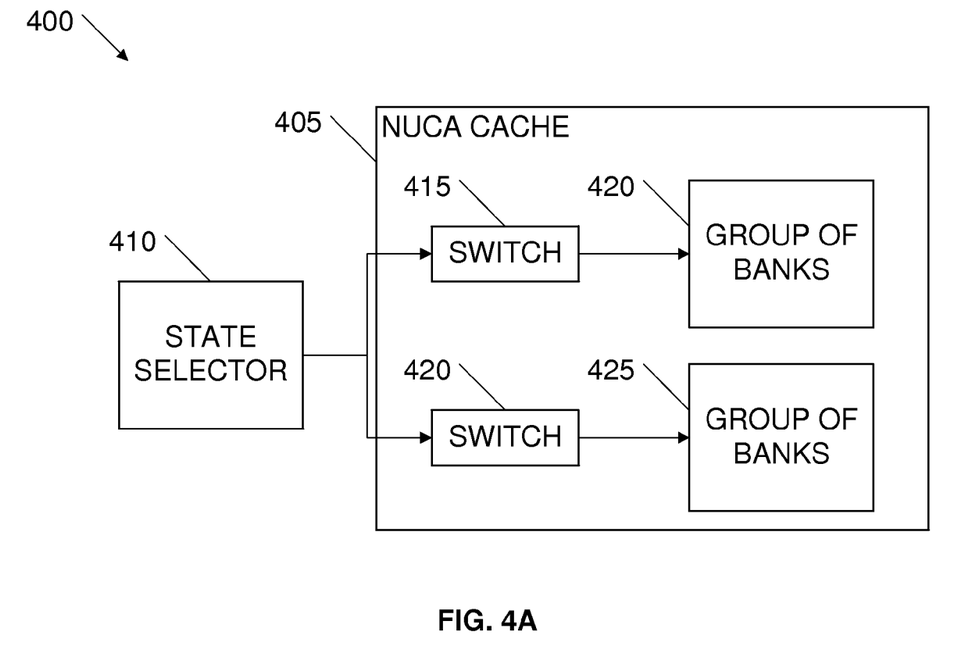
FIG. 4A depicts an apparatus for conserving power of a NUCA cache having groups of banks of the NUCA cache, switches coupled to the groups, and a state selector coupled to the switches.

FIGS. 4A-4D show several embodiments of apparatuses for conserving power in NUCA caches. FIG. 4A depicts an apparatus 400 for conserving power of a NUCA cache 405, having groups of banks 420 and 425, switches 415 and 420 coupled to the groups, and a state selector 410 coupled to switches 415 and 420. One or more elements of the apparatuses in FIGS. 4A-4D may be in the form of hardware, software, or a combination of both hardware and software. For example, state selector 410 of apparatus 400 may exist as instruction-coded modules stored in a memory device. More specifically, the modules may comprise software or firmware instructions of an application, executed by one or more processors. In alternative embodiments, one or more of the modules of the apparatus in FIGS. 4A-4D may comprise hardware-only modules. For example, one or more of the modules of apparatus 400 may comprise a state machine formed into an integrated circuit chip coupled with processors of a computing device.

NUCA cache 405 may comprise a vertically-striped NUCA cache. In other words, NUCA cache 405 may contain a number of banks wherein ways are vertically distributed across multiple banks. As a specific example, NUCA cache 405 may correspond to NUCA cache 240 depicted in FIG. 2A. Sixteen banks is only one embodiment, as the number of banks of a NUCA cache may vary from embodiment to embodiment. For example, an alternative embodiment may comprise 8, 32, or 64 banks, as examples.

The individual banks of NUCA cache 405 may be grouped or aggregated according to their relative access latencies. Continuing with our example of FIG. 2A, NUCA cache 240 may comprise two groups. The first group, with banks having the greatest access latencies, may consist of banks 230, 231, 232, and 233. The second group, with banks having the next-greatest access latencies, may consist of banks 220, 221, 222, and 223. Group of banks 420 and group of banks 425 may correspond to the first and second groups just described, respectively. Depending on the embodiment, varying numbers of groups may be turned off. For example, one embodiment of apparatus 400 may only turn off the first and second groups just described. In other words, the one embodiment of apparatus 400 may not turn off the remaining banks of 200 through 213. As one having ordinary skill in the art will appreciate, alternative embodiments of NUCA cache 405 may comprise other groups in addition to groups 420 and 425, depicted in FIG. 4A. For example, NUCA cache 405 may also comprise a third group and fourth group. The third group, with banks having the next-greatest access latencies, may consist of banks 210, 211, 212, and 213. The fourth group, with banks having the smallest or lowest access latencies, may consist of banks 200, 201, 202, and 203.

As shown in FIG. 4A, switches 415 and 420 of NUCA cache 405 may be coupled with a group of banks 420 and group of banks 425, respectively. Switches 415 and 420 may independently and separately turn off and on the groups of banks. For example, switch 415 may turn off and on group of banks 420 regardless of the operating state of group of banks 425. State selector 410 may be coupled to switches 415 and 420 to select different power states of NUCA cache 405. When conserving no power in NUCA cache 405, state selector 410 may enable switches 415 and 420 to turn on groups of banks 420 and 425. To conserve power, apparatus 400 may cause state selector 410 to first disable switch 415 and turn off group of banks 420, with group of banks 420 having greater access latencies than the banks of group of banks 425. To conserve additional power, apparatus 400 may cause state selector 420 to also disable switch 420 and turn off group of banks 425, wherein the banks of group of banks 425 have smaller access latencies than the banks of group 420. In other words, state selector 410 may be arranged to turn off groups of banks with the greatest access latencies before turning off other groups with smaller access latencies.

Switches 415 and 420 may comprise different types of elements in various alternative embodiments. For example, in many embodiments switch 415 may comprise one or more field effect transistors arranged to remove voltage (Vdd) and/or ground (Vss) from group of banks 420. Field effect transistors are just an example, as other types of devices to turn off and on the group of banks may be used in different embodiments. Additionally, some embodiments may conserve power in the groups of banks in a different manner than just removing power. For example, some embodiments may reduce the applied voltage, increase the voltage of the ground, or somehow restrict or limit the amount of power that the banks consume without necessarily switching the banks off.

Figure 4B:
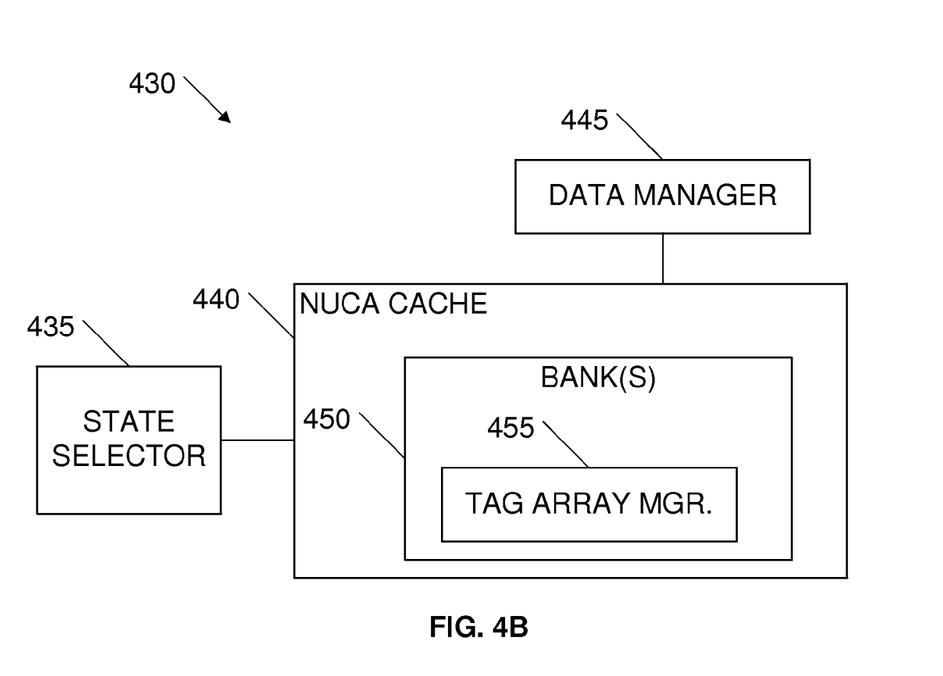
FIG. 4B shows an alternative embodiment of an apparatus for conserving power in a NUCA cache comprising a tag array manager and a data manager.

FIG. 4B depicts an alternative embodiment of an apparatus 430 configured to conserve power in NUCA cache 440. NUCA cache 440 may comprise a number of banks 450. NUCA cache 440 comprises a tag array manager 455 that maintains tags of NUCA cache 440. For example, tag array manager 455 may comprise a centralized partial-tag array that maintains partial tags, helps avoid generating false positives, and helps avoid the misdirection for incoming requests to banks which do not have the cache line being searched for. Maintaining the tags for banks 450 may prevent the searching of banks that have been turned off via state selector 435, when looking for cache hits. When a bank is switched off, the corresponding locations in the partial tag array of tag array manager 455 may be appropriately marked so that the tags are not used.

Apparatus 430 also comprises a data manager 445. Data manager 445 may monitor the operation of NUCA cache 440 to write out data of a group of banks to main memory before state selector 435 turns off the group. For example, NUCA cache 440 may correspond to NUCA cache 240. Apparatus 430 may need to turn off a first group comprising banks 230, 231, 232, and 233. However, one or more of banks 230, 231, 232, and 233 may contain dirty data, data that has been updated but not yet written to main memory. Data manager 445 may be configured to recognize the need to write the data from banks 230, 231, 232, and 233 to main memory before state selector 435 is permitted to turn off the group. Data manager 445 may run out the data to the main memory and then enable state selector 435 to turn off the group. As part of supporting the transfer of data from a bank to main memory, data manager 445 may be configured to temporarily implement write-through mode for the bank.

Figure 4C:
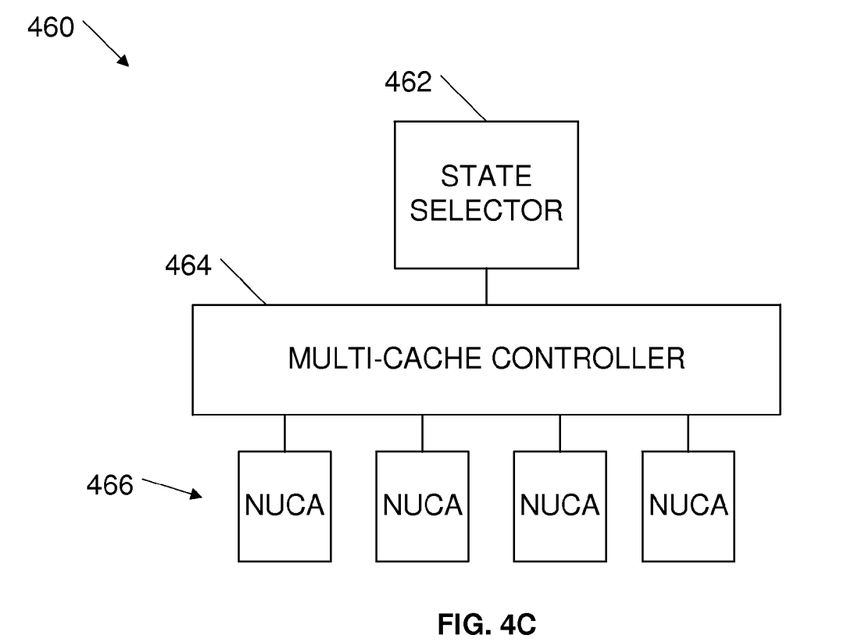
FIG. 4C shows another alternative embodiment of an apparatus for conserving power in NUCA caches comprising a multi-cache controller coupled with multiple NUCA caches.

FIG. 4C depicts a further alternative embodiment of an apparatus 460 configured to conserve power in a plurality of NUCA caches 466. Apparatus 460 comprises a multi-cache controller 464 coupled to the plurality of NUCA caches 466. As FIG. 4C illustrates, multi-cache controller 464 may be configured to select different power states of NUCA caches 466 based upon one more inputs from state selector 462. For example, multi-cache controller 464 may correspond to controller 150 depicted in FIG. 1, wherein multi-cache controller 464 may maintain tag arrays for the banks of NUCA caches 466. Upon receiving an input from state selector 462 to change power states, multi-cache controller 464 may flush the data from the banks to main memory before turning off the banks.

Figure 4D:
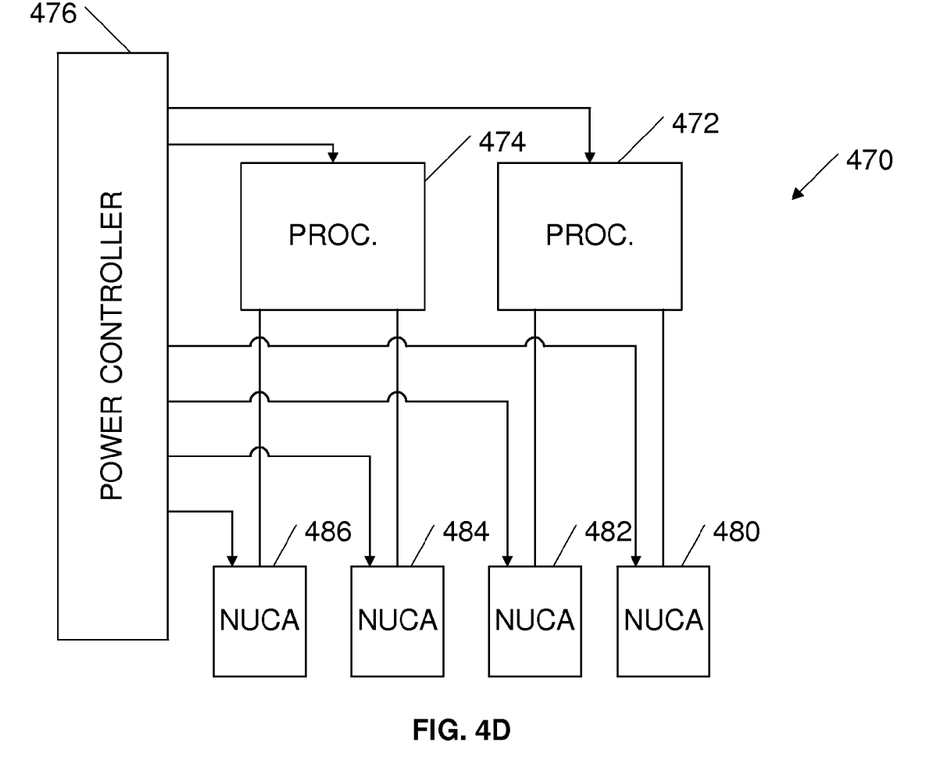
FIG. 4D depicts yet another embodiment of an apparatus for conserving power in several NUCA caches comprising multiple processors and a power controller.

FIG. 4D depicts yet another alternative embodiment of an apparatus 470 configured to conserve power in NUCA caches 480, 482, 484, and 486. Apparatus 470 comprises a power controller 476 coupled to processors 474 and 472, as well as NUCA caches 480, 482, 484, and 486. Power controller 476 may be configured to manage the overall power consumption of apparatus 470. For example, apparatus 470 may comprise a two-processor computing device, wherein power controller 476 may turn off and on various banks in NUCA caches 480, 482, 484, and 486 to switch between a number of different power states. Upon turning off an entire NUCA cache element, power controller 476 may conserve additional power by turning off a core of a processor or an entire processor. As a specific example, power controller 476 may sequentially turn off groups of banks of NUCA cache 480 until all of the banks of NUCA cache 480 have been turned off. Upon recognizing that all of the banks of NUCA cache 480 have been turned off, power controller 476 may turn off a core in processor 472 associated with NUCA cache 480. Power controller 476 may further sequentially turn off groups of banks of NUCA cache 482 until all of the banks of NUCA cache 482 have been turned off. Upon recognizing that all of the banks of NUCA cache 482 have been turned off, power controller 476 may turn off processor 472. Power controller 476 may also manage the power conservation for NUCA caches 486 and 484, switching off and on groups of banks to select different power states.

As noted, the number of modules or elements in an embodiment may vary in alternative embodiments. Some embodiments may have fewer elements than those elements depicted in FIGS. 4A-4D. For example, one embodiment may integrate the functions described and/or performed by state selector 410 with the switching functions of switches 415 and 420 into a single module. Further embodiments may include more modules or elements than the ones shown in FIGS. 4A-4D. For example, alternative embodiments may include two or more state selectors, such as for embodiments with a large number of NUCA cache elements. Even further embodiments may comprise modules or elements other than those depicted in FIGS. 4A-4D. For example, some embodiments may comprise an activity monitor to monitor the activity of one or more NUCA caches. The activity monitor may detect when an apparatus or system enters an idle state or a low activity state for an extended period of time. During such a period of inactivity the need for large amounts of data in the NUCA caches may diminish. The activity monitor may automatically trigger the state selector to turn off groups of banks, based on the monitored activity, to conserve power. Additionally, as activity increases, the activity monitor may automatically force the state selector to turn on additional groups of banks to meet the demand of the increased activity.

Figure 5:
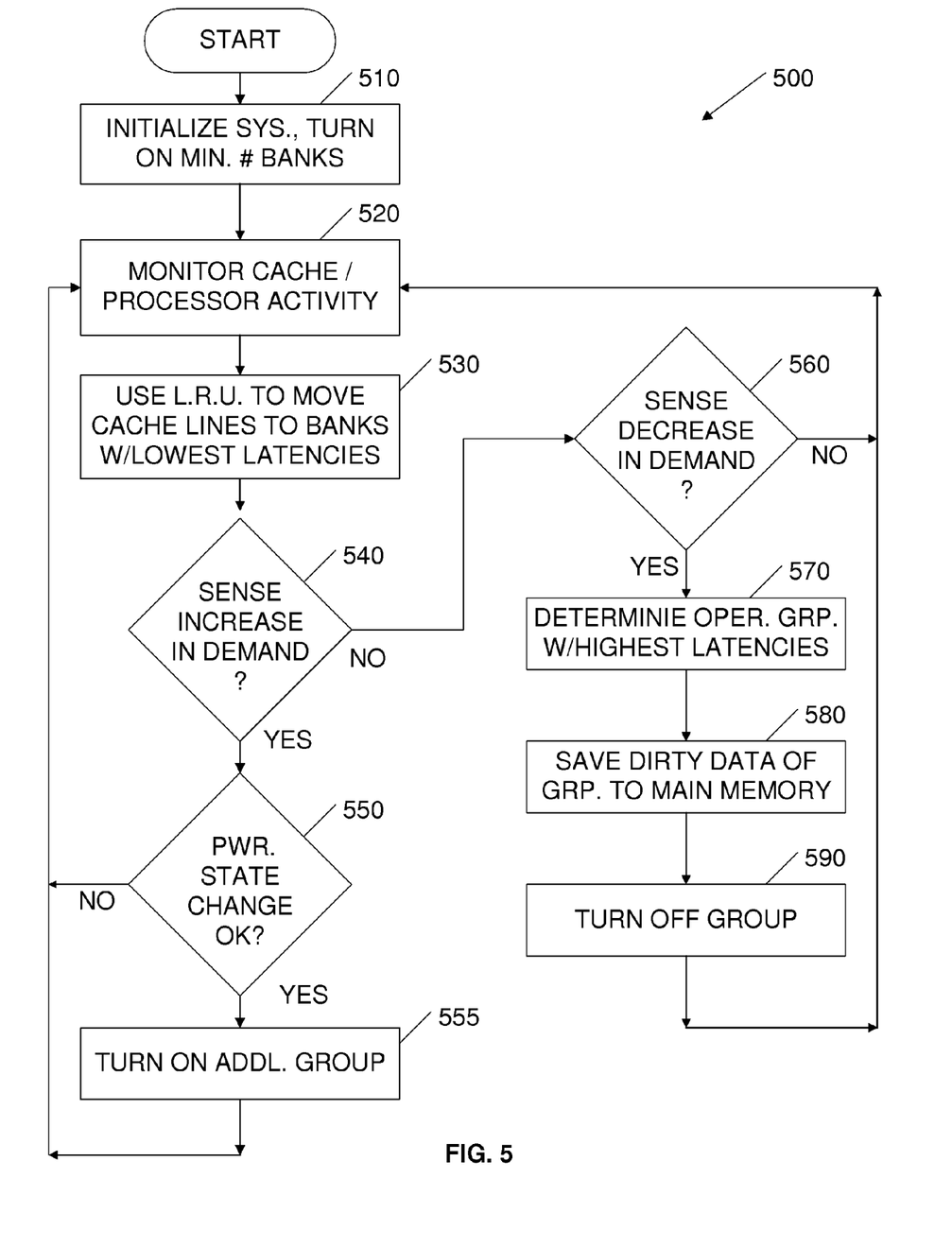
FIG. 5 depicts a flowchart illustrating how an embodiment may operate a plurality of banks of a NUCA cache, sense increases or decreases in demand, and switch banks of the NUCA cache accordingly.

FIG. 5 depicts a flowchart 500 illustrating how an embodiment may operate a plurality of banks of a NUCA cache, sense increases or decreases in demand, and switch banks of the NUCA cache accordingly. For example, the embodiment may be implemented as a computer program product comprising a computer readable storage medium including instructions that, when executed by a processor conserve power in the system depicted in FIG. 1 by sequentially turning off groups of banks in NUCA cache 135 and/or L3 cache 170. Alternatively, the process of flowchart 500 may be fully implemented in hardware, such as in a state machine of an ASIC coupled with system 100.

As illustrated in FIG. 5, the process may involve initializing a system and turning on a minimum number of banks of NUCA cache (element 510). For example, an operating system of system 100 may initialize system 100 during part of the boot process, turning on all of the banks of NUCA cache 135, which may comprise turning on banks 200 through 233 depicted in NUCA cache 240 of FIG. 2A.

As system 100 operates, controller 140 may monitor activity of NUCA cache 135 and/or the activity of processor 105 (element 520) and use a least-recently-used (LRU) algorithm to move cache lines to banks with the lowest or smallest latencies. For example, cache controller 150 may use hit/miss/invalidate detector 156, replacement assert logic 152, replacement negate logic 153, search logic 154, and data fill logic 155 to work in conjunction with cores 125 and 130 when searching NUCA cache 135 for hits and transferring data between NUCA cache 135 and system memory 175. Cache controller 150 may continually move the active cache lines to banks with the lowest latencies (element 530), such as by continually moving active cache lines in banks 230 through 233 to banks 200 through 223, shown in FIG. 2A.

During operation of system 100, cache controller 150 and/or other controllers may sense or detect increases and decreases in demand (elements 540 and 560), such as demands for additional cache searches or the decreases of such demands. If system 100 senses an increase in demand (element 540), system 100 may turn on one or more additional groups of NUCA cache banks (element 555) before resuming the monitoring of cache or processor activity (element 520). However, before turning on additional groups to respond to the increased demand, system 100 may first determine whether the change of power states is permissible (element 550). For example, system 100 may prevent the turning on of additional banks of NUCA cache if the battery of system 100 is dangerously low or if system 100 is in a state restricting the ability to turn on additional NUCA cache banks, such as with an aggressive laptop power saving scheme intended to maximize the amount of operating time for system 100.

If system 100 senses or detects a decrease in demand of NUCA cache activity (element 560), such as during a period of inactivity of system 100, cache controller 150 may select certain banks to turn off, work with the other modules of cache controller 150 to prevent fresh data/instructions from being copied into those banks, and then turn off the banks as soon as operationally feasible. For example, cache controller 150 may determine that the groups comprising banks 220 through 233 may be turned off to conserve power (element 570). Before turning off the groups containing banks 220 through 233 (element 590), controller 150 may first save any dirty data of banks 220 through 233 to system memory 175 (element 580) before continuing to monitor the NUCA cache for increases/decreases in activity or demand (element 520).

Flowchart 500 of FIG. 5 illustrates only one process. Alternative embodiments may implement innumerable variations of flowchart 500. For example, some alternative embodiments may not perform one or more functions illustrated by flowchart 500, such as an embodiment that does not monitor battery life to determine whether a power state change is permissible (element 550). Other alternative embodiments may perform actions in addition to the actions illustrated in FIG. 5, while even further alternative embodiments may eliminate or avoid other functions taught by flowchart 500.

Figure 6:
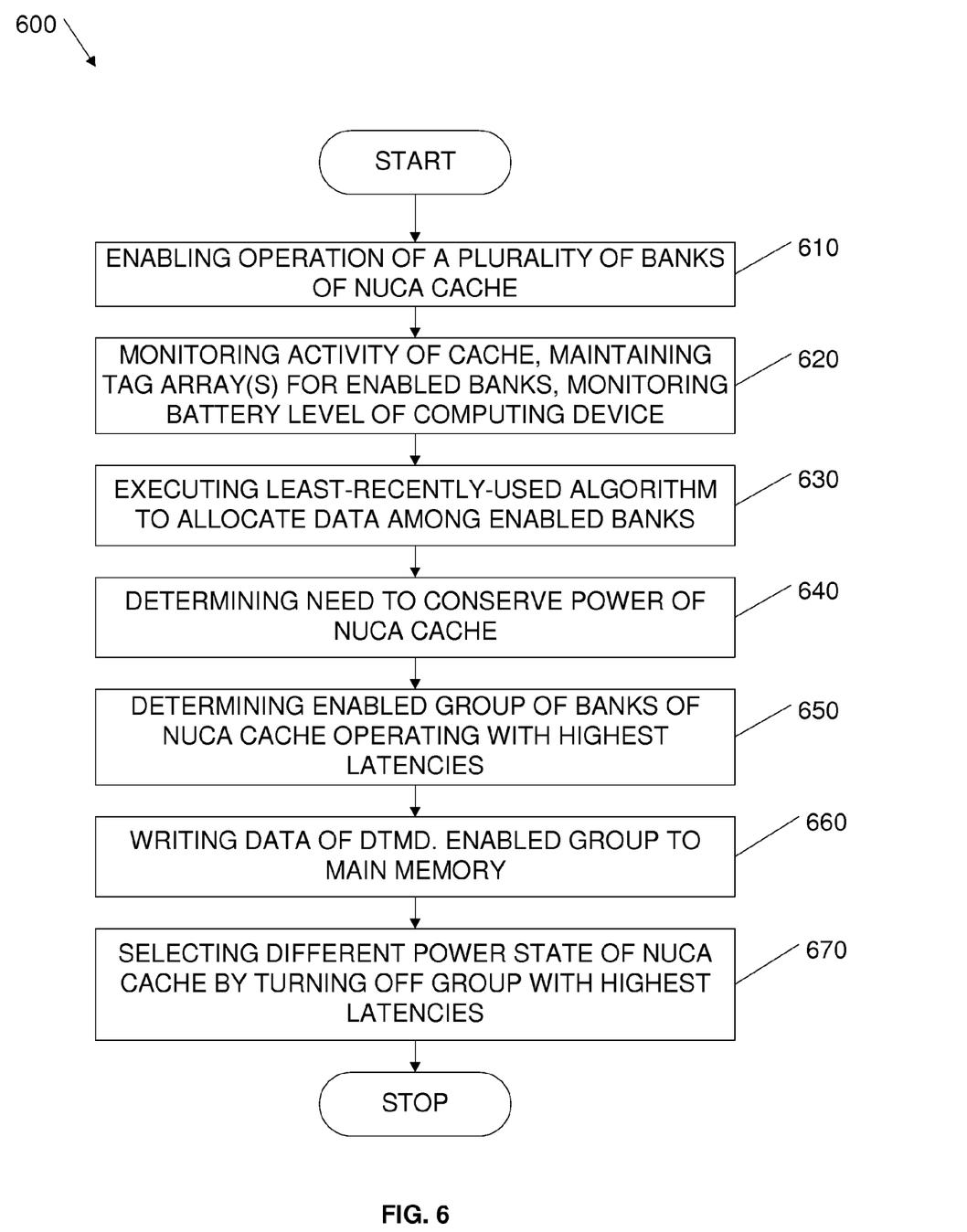
FIG. 6 illustrates one method for conserving power in a vertically distributed NUCA cache.

FIG. 6 illustrates a flowchart 600 of a method that may conserve power by sequentially enabling and disabling a number of banks of a NUCA cache, with the ways of the cache being vertically distributed across multiple banks. For example, one or more embodiments of apparatus 400 shown in FIG. 4A may implement the method described by flowchart 600 to conserve power by switching off group of banks 425 and group of banks 420.

As the system coupled to apparatus 400 operates, the system may enable the operation of a number of banks of a NUCA cache (element 610). For example, apparatus 400 may enable the operation of the sixteen banks in NUCA cache 240, depicted in FIG. 2A. While the system coupled to apparatus 400 operates, apparatus 400 may perform a variety of activities, such as monitoring activity of NUCA cache 240, maintaining tag arrays for enabled banks, monitoring the amount of battery life remaining (element 620). One detailed example, with reference to FIG. 4B, may involve apparatus 430 monitoring the activity of NUCA cache 440 for opportunities to conserve power, maintaining tag arrays for all enabled banks of banks 450, and monitoring the value stored in a particular memory address, wherein the memory address is updated by the system according to a measured power charge of the system battery.

As a system and/or apparatus operate, the system/apparatus may execute an LRU algorithm to allocate data among enabled banks (element 630). For example, with reference to the NUCA caches of FIGS. 4B and 2B, data manager 445 may monitor the activity of hits and misses of NUCA cache 440. Based on the monitored activity, data manager 445 may continually move the most active cache lines to banks with the lowest access latencies. As a more specific example, data manager 445 may move the most active cache lines from banks 230 and 233 to banks 231 and 232, from banks 231 and 232 to banks 220 and 223, to banks 221 and 222, etc.

As the system and/or apparatus continue operating, the system/apparatus may determine the need to conserve power in a NUCA cache (element 640), such as the case where power controller 476 senses the opportunity to conserve power by turning off eight groups of banks of NUCA caches 486, 484, 482, and 480, which may comprise eight enabled/operating groups with the highest access latencies (element 650).

An embodiment of flowchart 600 may continue by writing data of the eight groups to main memory (element 660), such as by determining which banks comprise data/instruction values that have not been written to system memory and copying the data/instruction values over to system memory.

Upon writing the values to system memory (element 660), the embodiment may then switch power states by turning off the eight groups (element 670). For example, turning off the eight groups may involve turning off two groups of banks in each of NUCA caches 486, 484, 482, and 480. For the sake of a detailed illustration, NUCA caches 486 and 484 may have all banks operating, whereupon power controller 476 may turn off two banks in both NUCA caches 486 and 484, e.g. one group comprising banks 230 and 233 and another group comprising banks 231 and 232. Referring to FIG. 3B, power controller 476 may switch NUCA caches 486 and 484 from state 320 (S0) to state 330 (S2). NUCA caches 482 and 480 may already have some groups turned off. For example, NUCA caches 482 and 480 may already be in state 335 (S3). In state 335, the two groups of banks with the next-highest access latencies may comprise the two groups containing banks 221 and 222, and containing banks 210 and 213, respectively. Power controller 476 may turn off banks 221, 222, 210, and 213 in both NUCA caches 482 and 480. Referring to FIG. 3B, power controller 476 may switch NUCA caches 482 and 480 from state 335 (S3) to state 345 (S5).

As an embodiment of flowchart 600 continues to operate, the embodiment may sequentially disable additional groups of banks to conserve additional amounts of power. The sequence of disabling may generally comprise turning off individual banks with the greatest access latencies before turning off individual banks with the least access latencies. For example, the embodiment will generally turn off groups comprising the banks located at the bottom of NUCA cache 240 before turning off groups comprising the banks located at the top of NUCA cache 240.

Another embodiment is implemented as a program product for implementing systems, methods, and apparatuses described with reference to FIGS. 1-6. Embodiments may contain both hardware and software elements. One embodiment may be implemented in software and include, but not limited to, firmware, resident software, microcode, etc.

Furthermore, embodiments may take the form of a computer program product accessible from a computer-usable or computer-readable medium providing program code for use by or in connection with a computer or any instruction execution system coupled with NUCA cache. For the purpose of describing the various embodiments, a computer-usable or computer readable medium may be any apparatus that can contain or store the program for use by or in connection with the instruction execution system, apparatus, or device.

The medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Those skilled in the art, having the benefit of this disclosure, will realize that the present disclosure contemplates conserving power in non-uniform cache access (NUCA) caches by sequentially turning off groups of banks according to a hierarchy of increasing access latencies. The form of the embodiments shown and described in the detailed description and the drawings should be taken merely as examples. The following claims are intended to be interpreted broadly to embrace all variations of the example embodiments disclosed.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
enabling the operation of a plurality of banks of a non-uniform cache access (NUCA) cache, wherein ways of the cache are vertically distributed across multiple banks of the plurality;
disabling, sequentially, individual banks of the plurality to conserve power of the NUCA cache, wherein the sequential disabling comprises firstly turning off individual banks with the greatest access latencies of banks of the NUCA cache and lastly turning off individual banks with the least access latencies, wherein further the disabling of the individual banks comprises turning off banks of the plurality grouped via discrete power states.

2. The method of claim 1, further comprising: determining whether data of an individual bank are different from data of memory associated with the individual bank and writing the data to the associated memory if the data are different.

3. The method of claim 2, further comprising: disabling the individual bank upon completion of the writing.

4. The method of claim 3, further comprising: marking a partial tag array of the NUCA cache to prevent usage of the disabled individual bank.

5. The method of claim 1, further comprising: selecting a power state via execution of instructions stored in a tangible medium of a computer.

6. The method of claim 5, wherein the instructions, when executed by a processor of the computer, are configured to monitor an amount of energy of a battery of the computer.

7. The method of claim 5, wherein the instructions, when executed by a processor of the computer, are configured to select the power state based upon inactivity of the NUCA cache.

8. An apparatus, comprising:
- a plurality of banks of a non-uniform cache access (NUCA) cache, wherein ways are vertically distributed across multiple banks of the plurality;
- a plurality of switches configured to turn off groups of banks of the plurality of banks, wherein banks are aggregated to the groups based on access latencies; and
- a state selector, coupled to the plurality of switches, to select different power states of the NUCA cache, wherein the state selector is arranged to turn off groups of banks with the larger access latencies before turning off other groups with smaller access latencies.

9. The apparatus of claim 8, further comprising an activity monitor to monitor activity of the NUCA cache, wherein the state selector is arranged to select the different power states based on the monitored activity, wherein the apparatus is configured to sequentially turn on groups of banks with the smaller access latencies before turning on groups with the larger access latencies.

10. The apparatus of claim 8, further comprising a multi-cache controller coupled to the NUCA cache and a second NUCA cache and a second plurality of switches, the multi-cache controller configured to select different power states of the NUCA cache and the second NUCA cache based upon an input from the state selector.

11. The apparatus of claim 8, further comprising a power controller coupled to a core and the NUCA cache, the power controller configured to monitor and control power of the core and the NUCA cache.

12. The apparatus of claim 11, further comprising a second core and a second NUCA cache, wherein the power controller is configured to turn off the second core and all groups of banks in the second NUCA cache while at least one group of the NUCA cache continues to operate.

13. The apparatus of claim 8, further comprising a tag array manager to maintain tags of the NUCA cache and prevent the searching of banks that are turned off.

14. The apparatus of claim 13, further comprising a data manager to write out data of a group of banks to enable the state selector to select a different power state.

15. The apparatus of claim 8, wherein the state selector comprises a state machine.

16. A computer program product comprising a tangible computer readable storage medium including instructions that, when executed by at least one processor:
- search ways of a plurality of banks of a non-uniform cache access (NUCA) cache, wherein the ways are vertically distributed across multiple banks of the NUCA cache; and
- sequentially turn off groups of banks of the plurality of banks, wherein each of the groups comprises banks aggregated based on access latencies of banks to the at least one processor, wherein further the sequence comprises turning off groups with larger access latencies before turning off groups with smaller access latencies.

17. The computer program product of claim 16, further comprising instructions that monitor an amount of power remaining in a battery to enable the sequential turning off of groups.

18. The computer program product of claim 16, further comprising instructions that mark locations in a partial tag array to prevent use of the locations, wherein the locations correspond to banks turned off.

19. The computer program product of claim 18, further comprising instructions that unmark the locations in the partial tag array to enable use of the locations when banks corresponding to the locations are turned on.

20. The computer program product of claim 16, wherein the instructions that sequentially turn off groups of banks comprise instructions of an operating system.

* * * * *